(12) United States Patent
Thakur et al.

(10) Patent No.: US 7,613,747 B1
(45) Date of Patent: Nov. 3, 2009

(54) TIERED DATABASE STORAGE AND REPLICATION

(75) Inventors: Brajendra Singh Thakur, Overland Park, KS (US); Nasir Mahmood Mirza, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 327 days.

(21) Appl. No.: 11/147,932

(22) Filed: Jun. 8, 2005

(51) Int. Cl.
G06F 12/00 (2006.01)
G06F 17/30 (2006.01)

(52) U.S. Cl. .......................... 707/204; 714/4; 711/117
(58) Field of Classification Search .................. 707/204
See application file for complete search history.

(56) References Cited

U.S. PATENT DOCUMENTS

| | | | | |
|---|---|---|---|---|
| 5,594,900 | A * | 1/1997 | Cohn et al. | 707/202 |
| 5,742,792 | A * | 4/1998 | Yanai et al. | 711/162 |
| 5,884,328 | A * | 3/1999 | Mosher, Jr. | 707/202 |
| 5,926,809 | A * | 7/1999 | Szalwinski | 707/3 |
| 5,933,653 | A * | 8/1999 | Ofek | 710/6 |
| 6,173,377 | B1 * | 1/2001 | Yanai et al. | 711/162 |
| 6,209,002 | B1 * | 3/2001 | Gagne et al. | 707/204 |
| 6,502,205 | B1 * | 12/2002 | Yanai et al. | 714/7 |
| 6,687,718 | B2 * | 2/2004 | Gagne et al. | 707/204 |
| 6,711,699 | B1 * | 3/2004 | Kanevsky et al. | 714/13 |
| 6,772,363 | B2 * | 8/2004 | Pedone et al. | 714/4 |
| 6,925,541 | B2 * | 8/2005 | Yamagami | 711/162 |
| 7,035,880 | B1 * | 4/2006 | Crescenti et al. | 707/204 |
| 7,062,624 | B2 * | 6/2006 | Kano | 711/165 |
| 7,107,298 | B2 * | 9/2006 | Prahlad et al. | 707/204 |
| 7,152,078 | B2 * | 12/2006 | Yamagami | 707/204 |
| 7,155,593 | B2 * | 12/2006 | Kano | 711/165 |
| 7,197,520 | B1 * | 3/2007 | Matthews et al. | 707/204 |
| 2001/0056431 | A1 * | 12/2001 | Sharples et al. | 707/104.1 |
| 2003/0074600 | A1 * | 4/2003 | Tamatsu | 714/6 |
| 2003/0078996 | A1 * | 4/2003 | Baldwin | 709/220 |
| 2003/0126107 | A1 * | 7/2003 | Yamagami | 707/1 |
| 2004/0093361 | A1 * | 5/2004 | Therrien et al. | 707/204 |
| 2004/0139128 | A1 * | 7/2004 | Becker et al. | 707/204 |
| 2004/0205390 | A1 * | 10/2004 | Kanevsky et al. | 714/13 |
| 2005/0021869 | A1 * | 1/2005 | Aultman et al. | 709/249 |
| 2005/0044114 | A1 * | 2/2005 | Kottomtharayil et al. | 707/204 |
| 2006/0041719 | A1 * | 2/2006 | Chui et al. | 711/117 |
| 2006/0136517 | A1 * | 6/2006 | Creamer et al. | 707/204 |
| 2006/0136518 | A1 * | 6/2006 | Creamer et al. | 707/204 |
| 2007/0078913 | A1 * | 4/2007 | Crescenti et al. | 707/204 |

OTHER PUBLICATIONS

"Multitier architecture", Sep. 13, 2006, Wikipedia, Wayback Machine, p. 1-3.*
"Partition (database)", Oct. 8, 2005, Wikipedia, Wayback Machine, p. 1-2.*
"Partition Types", Dec. 25, 2005, Sun Microsystems, MySQL 5.1 Online Reference Manual—Chapter 17.2, p. 1-3.*

* cited by examiner

Primary Examiner—Pierre M Vital
Assistant Examiner—Christopher P Nofal (57) ABSTRACT

A storage network comprising a production database configured to store a first production section on a first tier production storage system and a second production section on a second tier production storage system, a backup database configured to store a first backup section on a first tier backup storage system and a second backup section on a second tier production storage system, and a storage control system configured to replicate the first production section to the first backup session at a first frequency and replicate the second production section to the second backup section at a second frequency that is less than the first frequency.

13 Claims, 10 Drawing Sheets

TIERED DATABASE STORAGE AND REPLICATION

BACKGROUND OF THE INVENTION

1. Field of the Invention

The field of the invention relates to data storage systems, and in particular, to storage control systems for tiered control of database storage and replication.

2. Description of the Prior Art

Figure 1:
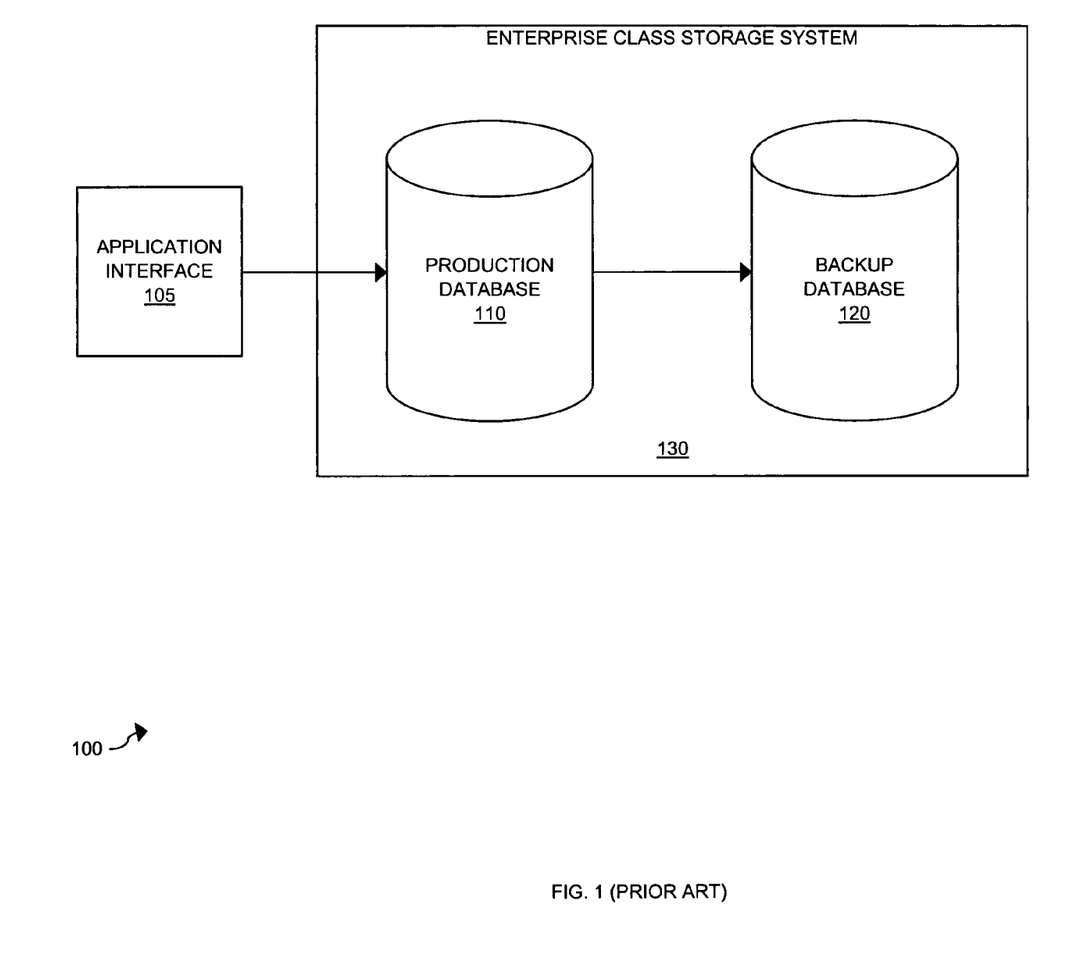
FIG. 1 illustrates a storage network in an example of the prior art.
Figure 2:
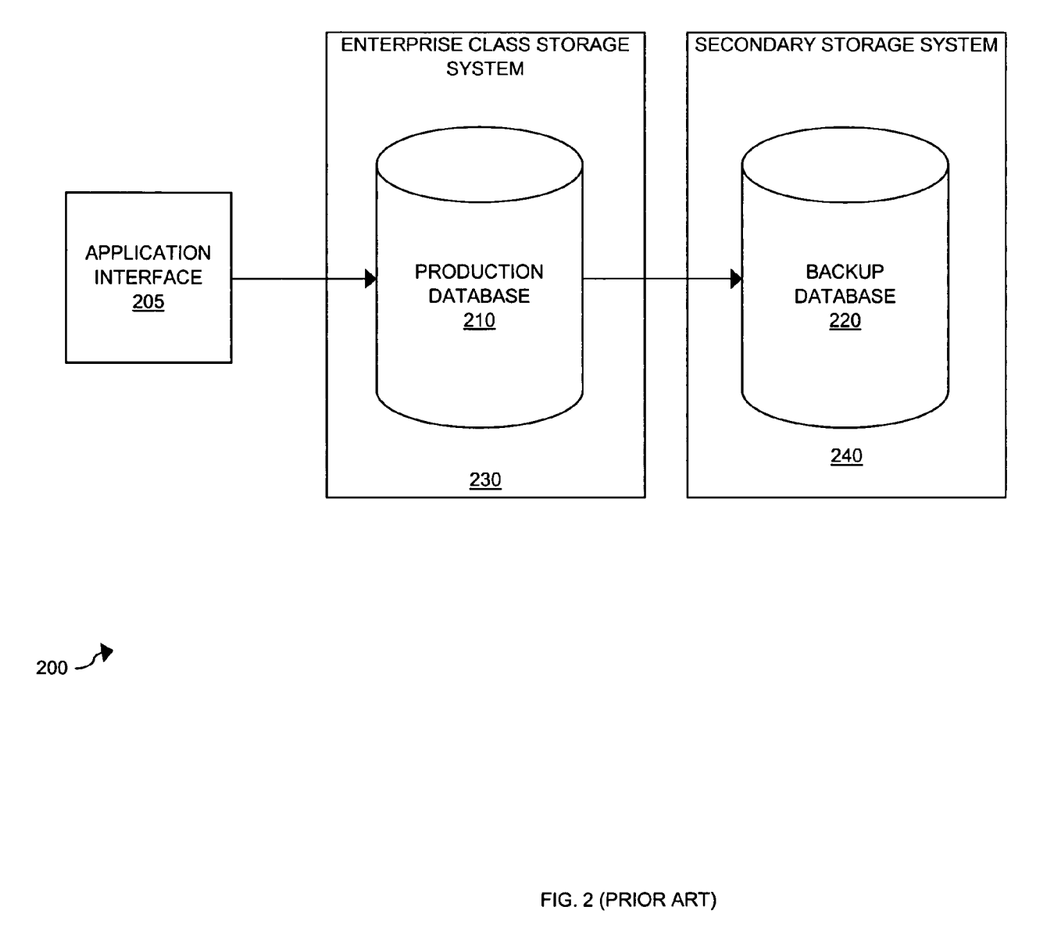
FIG. 2 illustrates a storage network in an example of the prior art.

Production databases are oftentimes replicated to backup databases to protect valuable data. FIGS. 1 and 2 illustrate storage systems 100 and 200 in the prior art whereby production databases 110 and 210 interface with applications via application interfaces 105 and 205 respectively. Production database 120 and 220 are replicated to backup databases 120 and 220 respectively.

As illustrated in FIG. 1, production database 110 and backup database 120 are both stored on an enterprise class storage system 130. Unfortunately, storing an entire backup database on the same type of storage system as the production database is very expensive and inefficient. Furthermore, replicating the entirety of a production database is very expensive and inefficient.

As illustrated in FIG. 2, production database 210 is stored on an enterprise class storage system 230, while backup database 220 is stored on a secondary storage system 240 having a lower quality than enterprise class storage system 230. Unfortunately, replicating entire production databases to lower quality storage systems detrimentally affects the ability to retrieve data from the backup databases when so desired. Additionally, the problem of replicating the entirety of a production database remains.

SUMMARY OF THE INVENTION

An embodiment of the invention helps solve the above problems and other problems by providing a storage control system, method, and software that allows for efficient database storage and replication capabilities. In particular, production databases can be segregated between sections that should be replicated frequently, and other portions that do not require frequent replication. In addition, an embodiment of the invention provides for replicating different sections of production databases to differently tiered storage systems, thereby reducing storage costs and improving replication capabilities.

In an embodiment, a storage network comprises a production database configured to store a first production section on a first tier production storage system and a second production section on a second tier production storage system, a backup database configured to store a first backup section on a first tier backup storage system and a second backup section on a second tier production storage system, and a storage control system configured to replicate the first production section to the first backup session at a first frequency and replicate the second production section to the second backup section at a second frequency that is less than the first frequency.

In an embodiment, the first production section comprises a first collection of production data having a first characteristic that satisfies a first constraint, and wherein the second production section has a second collection of production data having a second characteristic that satisfies a second constraint.

In an embodiment, the storage control system is further configured to receive new production data indicating a new characteristic, process the new production data to determine if the new characteristic satisfies either the first constraint or the second constraint, store the new production data in the first production section if the new characteristic satisfies the first constraint, and store the new production data in the second production section if the new characteristic satisfies the second constraint.

In an embodiment, the first characteristic comprises a first date, the first constraint comprises a first time frame, the second characteristic comprises a second date, and the second constraint comprises a second time frame.

In an embodiment, the second tier production storage system has a lower quality than the first tier production storage system.

In an embodiment, the second tier backup storage system has a lower quality than the first tier backup storage system.

In an embodiment, the production database comprises a call record database.

In an embodiment, the first frequency comprises once per day and wherein the second frequency comprises once per month.

BRIEF DESCRIPTION OF THE DRAWINGS

The same reference number represents the same element on all drawings.

DETAILED DESCRIPTION OF THE PREFERRED EMBODIMENT

FIGS. 3-10 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

First Embodiment Configuration and Operation

Figure 3:
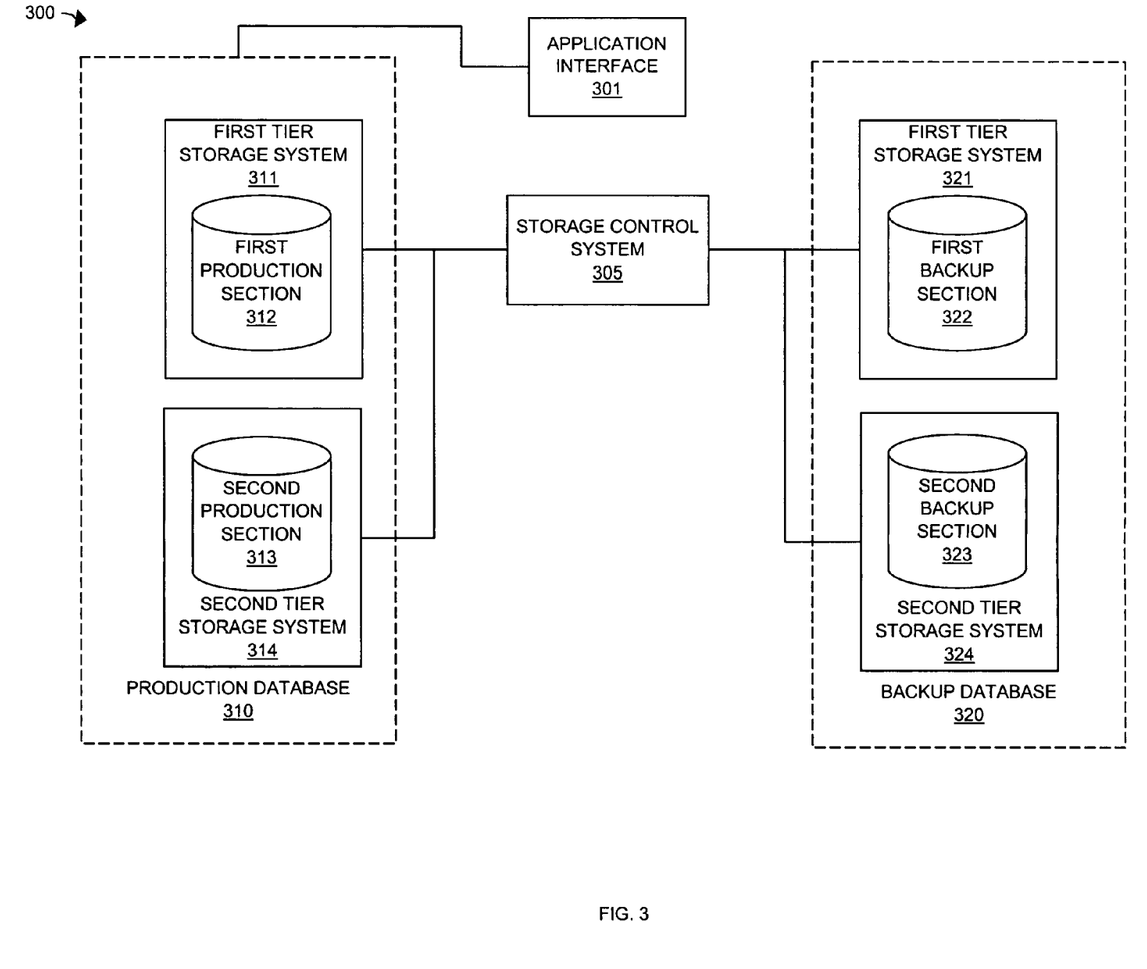
FIG. 3 illustrates a storage network in an embodiment of the invention.
Figure 4:
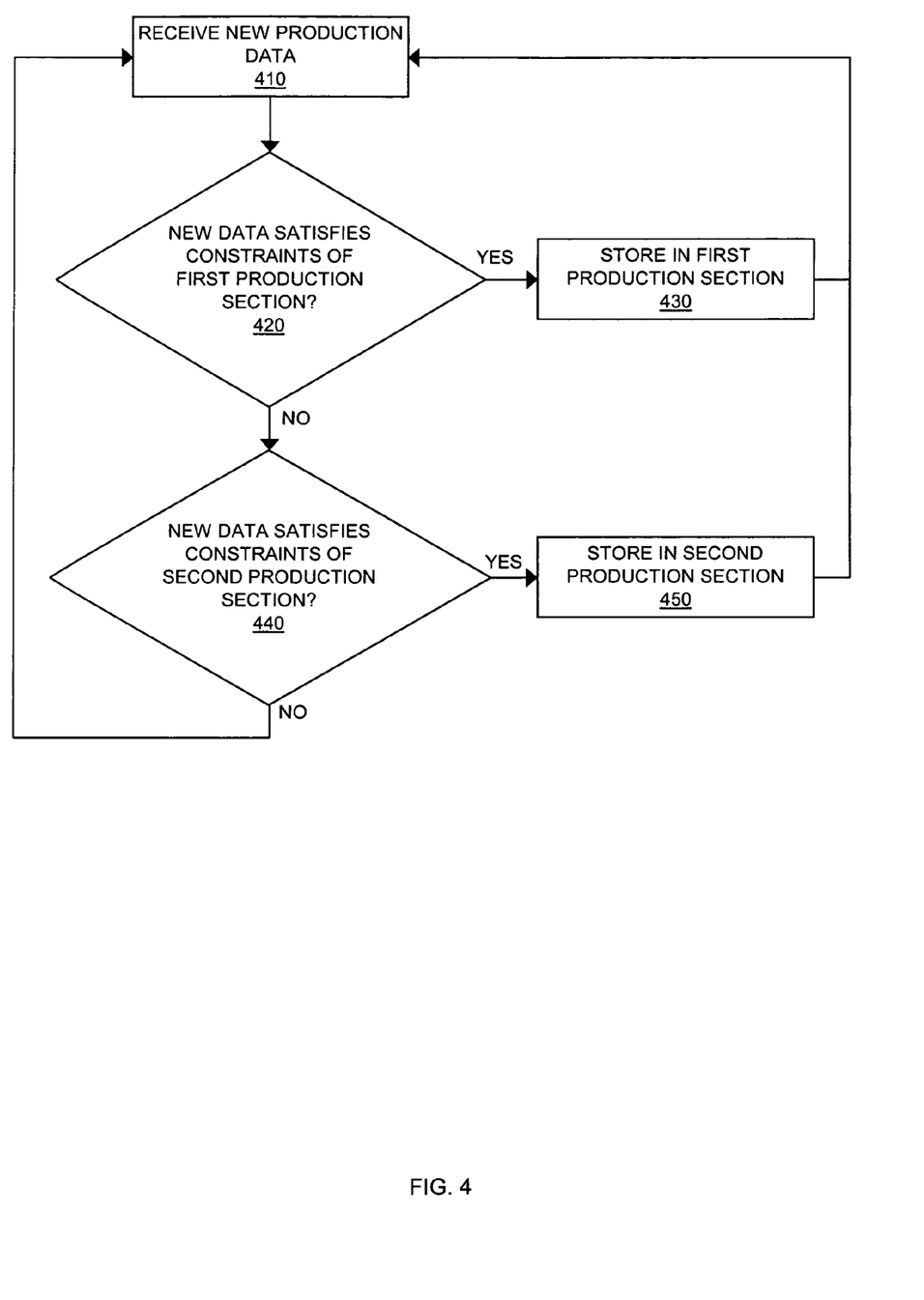
FIG. 4 illustrates the operation of a storage network in an embodiment of the invention.

FIGS. 3 and 4

FIG. 3 illustrates storage network 300 in an embodiment of the invention. Storage network 300 includes application interface 301 in communication with production database 310. Storage control system 305 controls replication between production database 310 and backup database 320. Production database 310 comprises first production section 312 and second production section 313. Backup database 320 comprises first backup section 322 and second backup section 323. First production section 312 is stored on first tier storage system 311. Second production section 314 is stored on second tier storage system 314. First backup section 322 is stored on first tier storage system 321. Second backup section 323 is stored on second tier storage system 324.

It should be understood that a first tier storage system could be a storage system that provides greater storage capabilities than a second tier storage system. For example, a first storage system could be more reliable than a second tier storage system. In another example, a first tier storage system could provide faster input and output access than a second tier storage system. For these and other reasons, databases requiring high levels of reliability and fast access rates are frequency stored on first tier storage systems. The cost of first tier storage systems is a drawback relative to second tier storage systems.

FIG. 4 illustrates a flowchart for populating production database 310 with data in an embodiment of the invention. During operation, data is generated and transferred to storage network 300 by applications interfacing with application interface 301 (Step 410). The data is received and processed to determine whether to store the new data in first production section 312 or second production section 313 (Steps 420 and 440). The data is stored in first production section 312 if the data satisfies the constraints of first production section 312 (Step 430). Likewise, the data is stored in second production section 313 if the data satisfies the constraints of second production section 313 (Step 450). Depending upon the operation of the applications interfacing with applications interface 301, production database 310 can change. For instance, data can be added, deleted, or altered.

Figure 5:
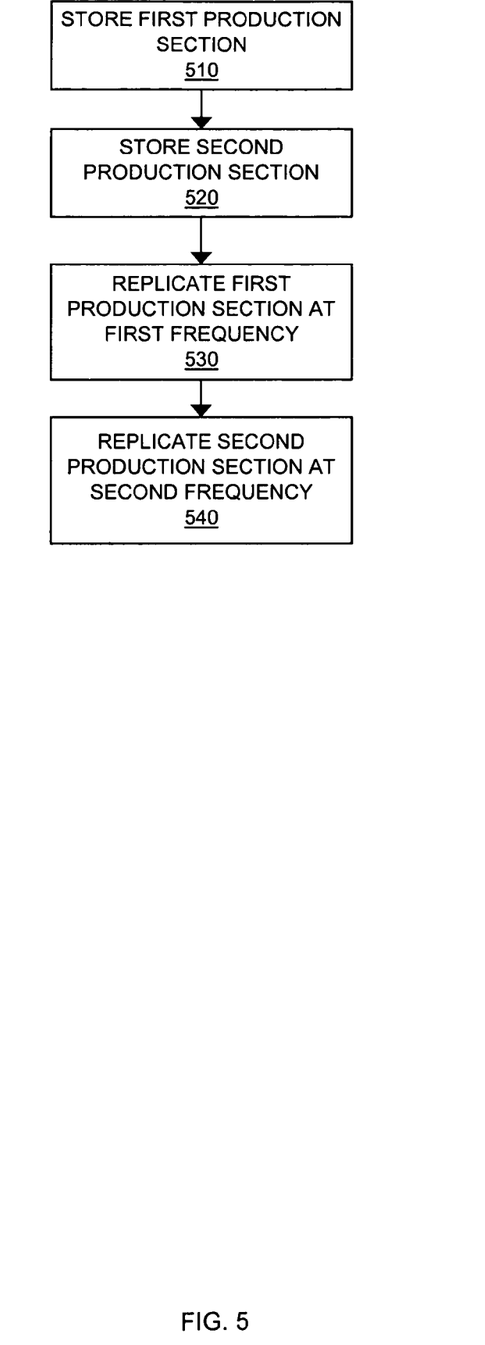
FIG. 5 illustrates the operation of a storage network in an embodiment of the invention.

FIG. 5 illustrates the operation of storage control system 305 in an embodiment of the invention whereby production database 310 is replicated to backup database 320. As discussed above, production database 310 is separated into first and second production sections 312 and 313. The data is apportioned to either production section 312 or 313 based upon a constraint associated with each production section. In this case, one set of data is stored in first production section 312 based on whether the characteristics of the data set satisfy the constraints of first production section 312 (Step 510). Similarly a second set of data is stored in second production section 313 depending upon whether the characteristics of the data set satisfy the constraints associated with second production section 313 (Step 520).

At certain times, it is desirable to backup production database 310. To backup production database, first production section 312 is replicated to first backup section 322 at a first frequency (Step 530), while second production section 313 is replicated to second backup section 323 at a second frequency (Step 540). It should be understood that, to save resources and create efficiencies, the second frequency is a lower frequency than the first frequency. For example, first production section 312 could be replicated to first backup section 322 daily, whereas second production section 313 could be replicated to second backup section 323 monthly.

Advantageously, storage network 300 provides for storing different portions of a single database on different types of storage systems. Further advantageously, storage network 300 provides for replicating different portions or sections of a single database at different rates or frequencies. In another advantage, storage network 300 provides for replicating different portions of a single database to different types of storage systems. In this manner, cost savings are realized by storing distinctly separate portions of a single database in or on less expensive production and backup storage systems, while utilizing high quality storage systems for other distinctly separate portions of a single database.

Telecommunications Example

FIGS. 6-9

Figure 6:
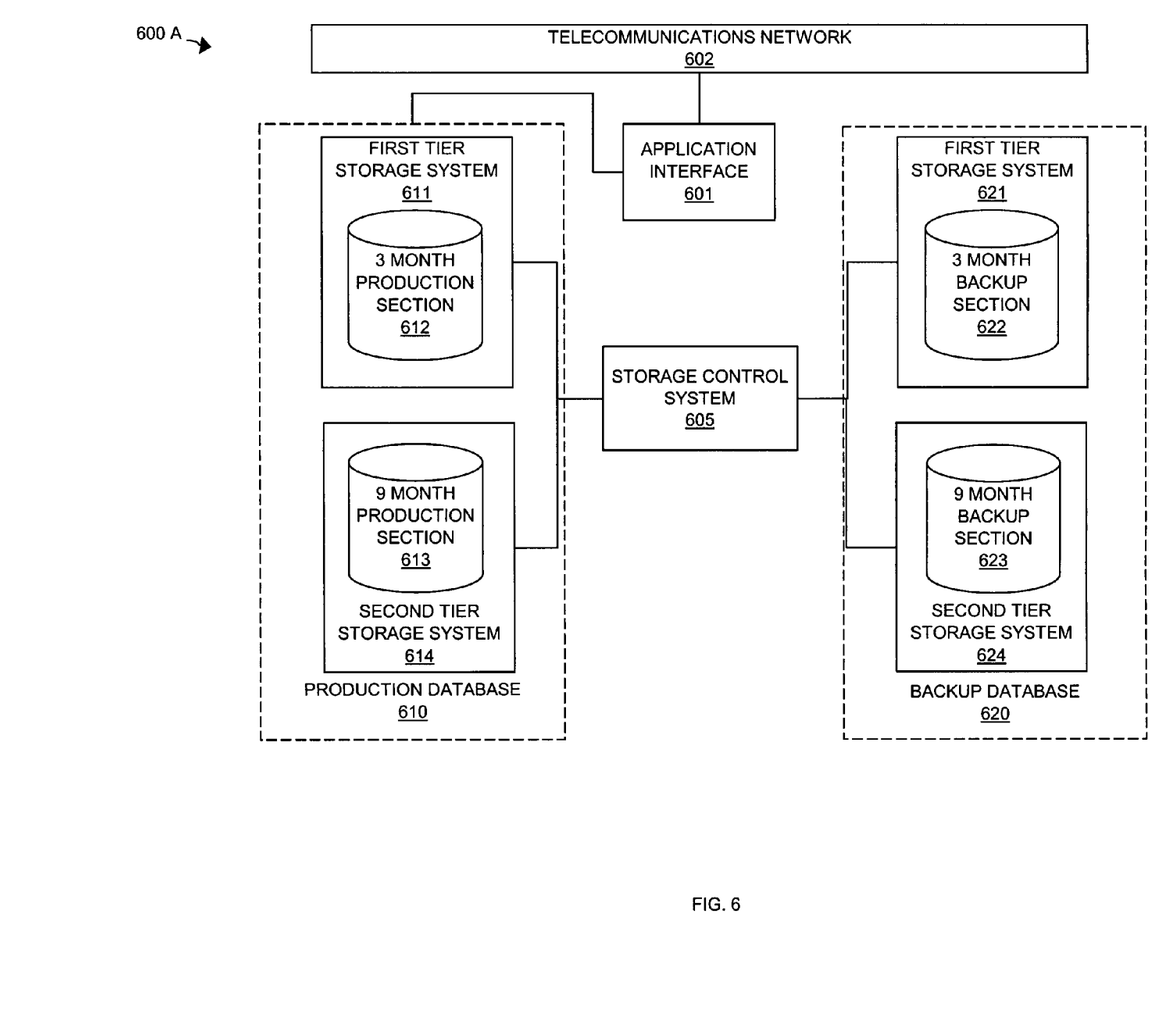
FIG. 6 illustrates a storage network in an embodiment of the invention.

FIG. 6 illustrates storage network 600A in an embodiment of the invention. In the telecommunications industry, it is well known that customers frequency dispute recent billing activity, whereas older billing activity has either already been resolved or will most likely not be disputed. Thus, recent call records are frequently changed, whereas older call records are rarely changed. In this embodiment, storage network 600 provides for replicating relatively recent call records frequently, and replicating relatively less recent call records less frequently, if at all. In this manner, costs are reduced by storing frequently updated data on first tier storage systems, and less frequently updated data on second tier storage systems. It is also known that very recent calls that have not yet been presented to customers are very rarely disputed.

In this embodiment, storage network 600 includes telecommunications network 602 in communication with application interface 601. Telecommunications network 602 includes systems applications, such as billing system applications. Application interface 601 interfaces production database 610 to billing applications in telecommunications network 602. Storage control system 605 is coupled to production database 610 and backup database 620.

In response to network activity, the billing application of telecommunications network 602 interfaces with production database 610 on a real-time basis via application interface 601 to record events for later billing. For example, a customer could make a call to a destination. In response to the call, a call record is generated indicating the customer, the destination, and the date and time of the call, among other information. The call record is then transferred application interface 601 and stored in production database 610.

Figure 7:
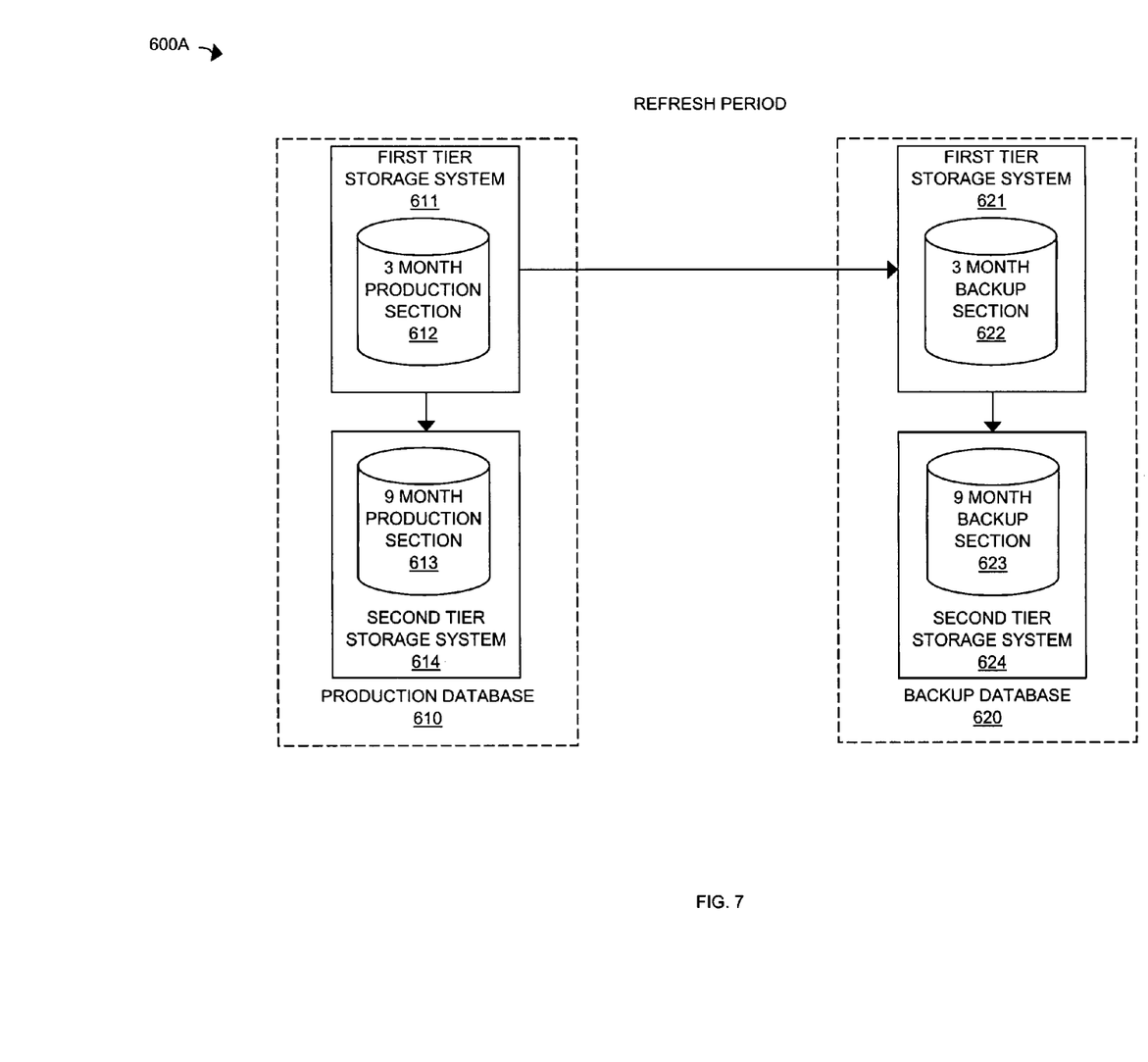
FIG. 7 illustrates a flow diagram in an embodiment of the invention.

FIG. 7 illustrates a flow of data during the backup process for storage network 600 in an embodiment of the invention whereby the three-month and nine-month windows are determined on a moving basis. Data for the most recent three months is stored in three month production section 612 of production database 610. Data for the next nine months is stored in nine-month production section 613 of production database 610. A new call record would presumably have a date falling within the most recent three months and is therefore stored in three-month production section 612.

In this embodiment, storage network 600 enters a refresh period. Production data stored in three-month production section 612 that no longer falls within the prescribed three-month window is transferred to nine-month production section 613. As part of the backup process, three-month production section 612 is replicated to three-month backup section 622 of backup database 610. Lastly, backup data that no longer falls within the three-month window of time is transferred to nine-month backup section 623. In this manner, a replication process is only required between three-month production section 612 and three-month backup section 622, thereby saving resources and reducing the amount of time required for database backup procedures.

Figure 8:
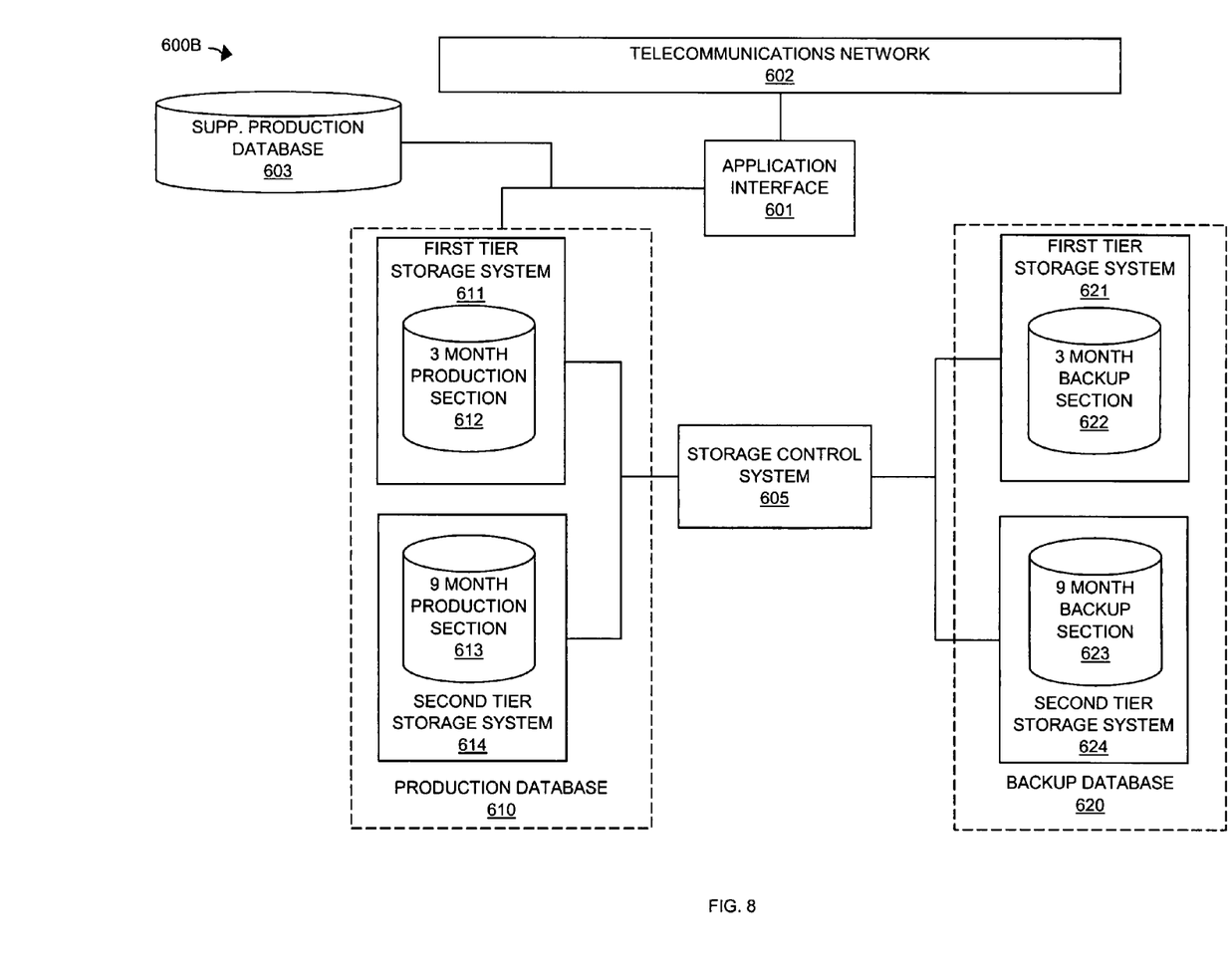
FIG. 8 illustrates a storage network in an embodiment of the invention.
Figure 9:
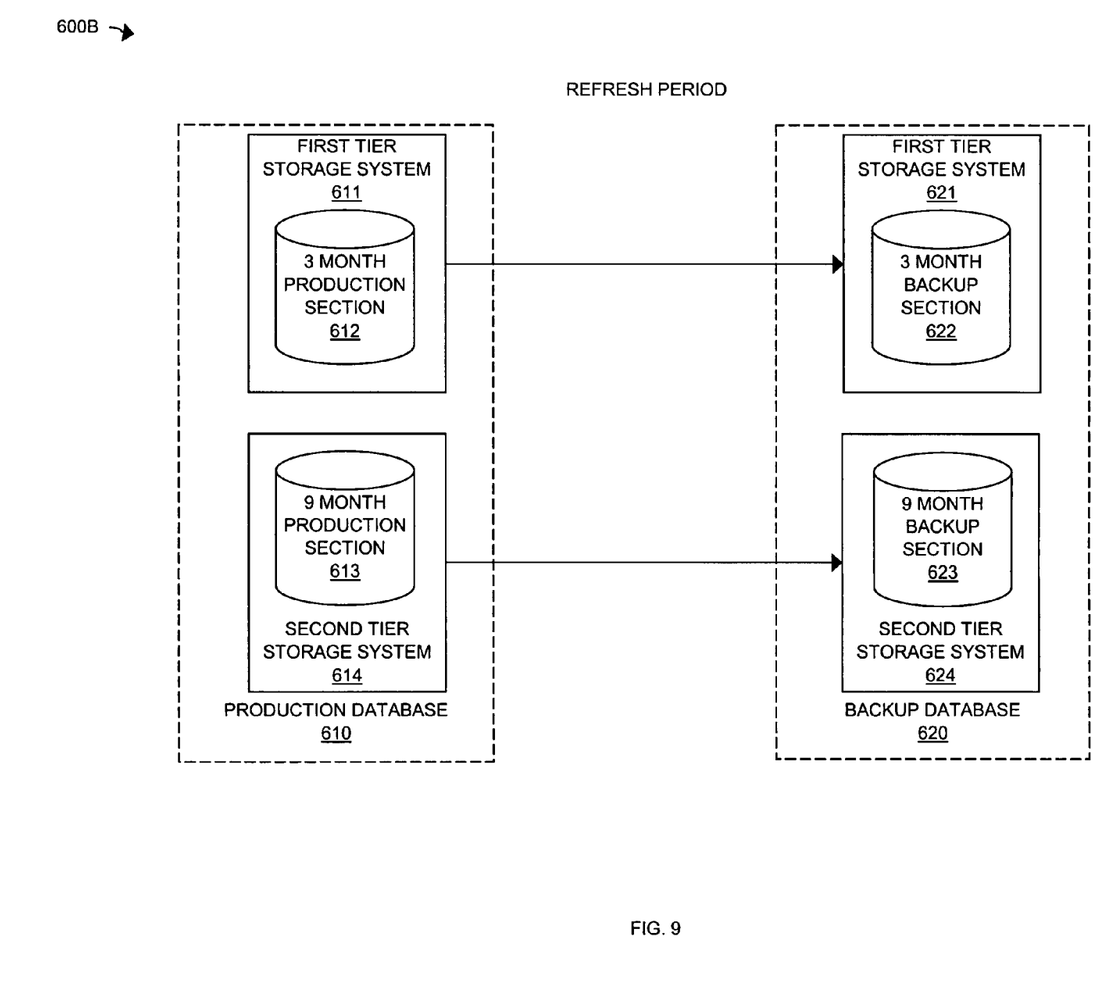
FIG. 9 illustrates a flow diagram in an embodiment of the invention.

FIG. 8 illustrates storage network 600B in an embodiment of the invention. Storage network 600B contains all of the same elements of storage network 600A, but with the additional element in supplemental production database 603. FIG. 9 illustrates a flow of data during the backup process for storage network 600B in an embodiment of the invention whereby the three-month and nine-month windows are determined based on a fixed basis. This discussion assumes that production database 610 has already been populated with data stored accordingly in either three-month production section 612 or nine-month production section 613. A fixed window requires that, even as network operations proceed on a daily basis, the timeframe defining production sections 612 and 613 remain fixed. Each day moving forward increases the difference between the actual present date and the first date of the three-month window.

To accommodate a fixed window timeframe, supplemental database 603 could be utilized to store the most recent data on a moving basis. Thus, past production data falling within the three-month or nine-month window can be stored in production database 610. New production data that is more recent than the earliest date of the three-month window can be stored in supplemental production database 603.

Upon entering a refresh period, production data from three-month production section 612 is replicated to three-month backup section 622 on a daily basis to account for frequent changes to production data. Production data from nine-month production section 613 is replicated to nine-month backup section 623 on a less frequent basis, as nine-month data is rarely changed. The latest data stored in supplemental production database 603 can be replicated to a supplemental backup database.

In this manner, storage network 600 advantageously allows for retaining very recent call records in supplemental production database 603 for later transfer to production database 610. Call records in supplemental production database 603 are very rarely disputed by customers. Relatively less recent call records falling within a fixed three-month window can be stored advantageously on a first-tier storage system for frequent access by customers or management when resolving call record disputes. Call records falling within a fixed nine-month window can be stored on a second tier storage system, thereby reducing costs.

Computer System

Figure 10:
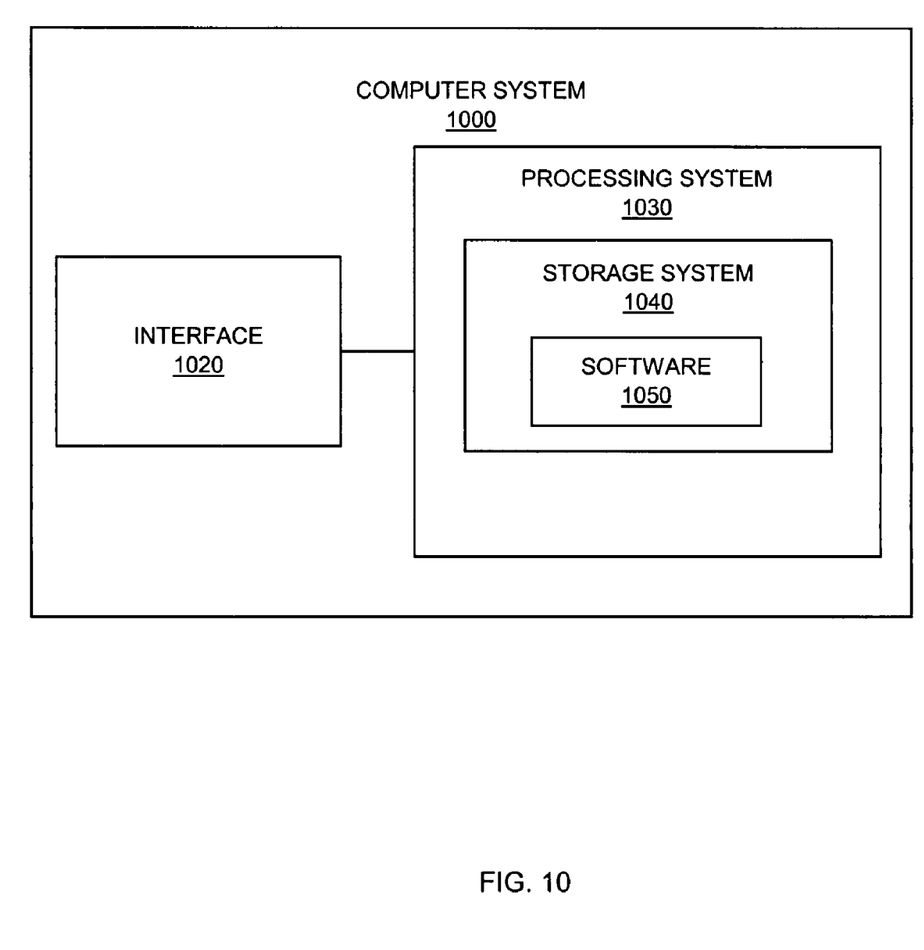
FIG. 10 illustrates a computer system in an embodiment of the invention.

FIG. 10

FIG. 10 illustrates computer system 1000 in an embodiment of the invention. Computer system 1000 includes interface 1020, processing system 1030, storage system 1040, and software 1050. Storage system 1040 stores software 1050. Processing system 1030 is linked to interface 1020. Computer system 1000 could be comprised of a programmed general-purpose computer, although those skilled in the art will appreciate that programmable or special purpose circuitry and equipment may be used. Computer system 1000 may use a client server architecture where operations are distributed among a server system and client devices that together comprise elements 1020-1050.

Interface 1020 could comprise a network interface card, modem, port, or some other communication device. Signaling interface 1020 may be distributed among multiple communication devices. Interface 1030 could comprise a computer microprocessor, logic circuit, or some other processing device. Processing system 1030 may be distributed among multiple processing devices. Storage system 1040 could comprise a disk, tape, integrated circuit, server, or some other memory device. Storage system 1040 may be distributed among multiple memory devices.

Processing system 1030 retrieves and executes software 1050 from storage system 1040. Software 1050 may comprise an operating system, utilities, drivers, networking software, and other software typically loaded onto a general-purpose computer. Software 1050 could also comprise an application program, firmware, or some other form of machine-readable processing instructions. When executed by the processing system 1030, software 1050 directs processing system 1030 to operate as described for the elements of storage networks 300, 600A, and 600B.

What is claimed is:

1. A storage network comprising:
a first tier production storage system configured to store a first production section of a production database;
a second tier production storage system configured to store a second production section of the production database;
a first tier backup storage system configured to store a first backup section of a backup database;
a second tier backup storage system configured to store a second backup section of the backup database; and
a storage control system configured to replicate the first production section on the first tier production storage system to the first backup section on the first tier backup storage system at a first frequency and replicate the second production section on the second tier production storage system to the second backup section on the second tier backup storage system at a second frequency that is less than the first frequency;
wherein the first production section comprises a first collection of production data, wherein each of the first collection of production data is associated with a first time frame, and wherein the second production section comprises a second collection of production data, wherein each of the second collection of production data is associated with a second time frame older than the first time frame;
wherein the second time frame immediately precedes the first time frame;
wherein the first time frame and the second time frame each comprises a movable time frame defined in relation to a current time;
wherein the storage control system is configured to transfer data within the first production section on the first tier production storage system no longer associated with the first time frame to the second production section on the second tier production storage system; and
wherein the storage control system is configured to replicate the second production section on the second tier production storage system to the second backup section on the second tier backup storage system by transferring data within the first backup section on the first tier backup storage system no longer associated with the first time frame to the second backup section on the second tier backup storage system.

2. The storage network of claim 1 wherein the storage control system is further configured to receive new production data, process the new production data to determine if the new production data is associated with the first time frame or the second time frame, store the new production data in the first production section if the new production data is associated with the first time frame, and store the new production data in the second production section if the new production data is associated with the second time frame.

3. The storage network of claim 1 wherein the second tier production storage system has a lower quality than the first tier production storage system.

4. The storage network of claim 3 wherein the second tier backup storage system has a lower quality than the first tier backup storage system.

5. The storage network of claim 1 wherein the production database comprises a call record database.

6. The storage network of claim 1 wherein the first frequency comprises once per day and wherein the second frequency comprises once per month.

7. A computer-implemented method of operating a storage network, the method comprising:
   storing a first production section of a production database on a first tier production storage system;
   storing a second production section of the production database on a second tier production storage system;
   storing a first backup section of a backup database on a first tier backup storage system;
   storing a second backup section of the backup database a second tier backup storage system;
   replicating the first production section on the first tier production storage system to the first backup section on the first tier backup storage system at a first frequency; and
   replicating the second production section on the second tier production storage system to the second backup section on the second tier backup storage system at a second frequency that is less than the first frequency;
   wherein the first production section comprises a first collection of production data, wherein each of the first collection of production data is associated with a first time frame, and wherein the second production section comprises a second collection of production data, wherein each of the second collection of production data is associated with a second time frame older than the first time frame;
   wherein the second time frame immediately precedes the first time frame;
   wherein the first time frame and the second time frame each comprises a movable time frame defined in relation to a current time;
   wherein the method further comprises transferring data within the first production section on the first tier production storage system no longer associated with the first time frame to the second production section on the second tier production storage system; and
   wherein replicating the second production section on the second tier production storage system to the second backup section on the second tier backup storage system comprises transferring data within the first backup section on the first tier backup storage system no longer associated with the first time frame to the second backup section on the second tier backup storage system.

8. The method of claim 7 further comprising receiving new production data, processing the new production data to determine if the new production data is associated with the first time frame or the second time frame, storing the new production data in the first production section if the new production data is associated with the first time frame, and storing the new production data in the second production section if the new production data is associated with the second time frame.

9. The method of claim 7 wherein the second tier production storage system has a lower quality than the first tier production storage system.

10. The method of claim 7 wherein the second tier backup storage system has a lower quality than the first tier backup storage system.

11. The method of claim 7 wherein the production database comprises a call record database.

12. The method of claim 7 wherein the first frequency comprises once per day and wherein the second frequency comprises once per month.

13. A computer-readable storage medium storing computer executable instructions for operating a storage control system, the computer executable instructions, when executed by a computer system, directing the computer system to:
   store a first production section of a production database on a first tier production storage system, store a second production section of the production database on a second tier production storage system, store a first backup section of a backup database on a first tier backup storage system, store a second backup section of the backup database a second tier backup storage system, replicate the first production section on the first tier production storage system to the first backup section on the first tier backup storage system at a first frequency, and replicate the second production section on the second tier production storage system to the second backup section on the second tier backup storage system at a second frequency that is less than the first frequency;
   wherein the first production section comprises a first collection of production data, wherein each of the first collection of production data is associated with a first time frame, and wherein the second production section comprises a second collection of production data, wherein each of the second collection of production data is associated with a second time frame older than the first time frame;
   wherein the second time frame immediately precedes the first time frame;
   wherein the first time frame and the second time frame each comprises a movable time frame defined in relation to a current time;
   wherein the computer executable instructions direct the computer system to transfer data within the first production section on the first tier production storage system no longer associated with the first time frame to the second production section on the second tier production storage system; and
   wherein the computer executable instructions direct the computer system to replicate the second production section on the second tier production storage system to the second backup section on the second tier backup storage system by directing the computer system to transfer data within the first backup section on the first tier backup storage system no longer associated with the first time frame to the second backup section on the second tier backup storage system.

* * * * *

UNITED STATES PATENT AND TRADEMARK OFFICE
CERTIFICATE OF CORRECTION

PATENT NO.       : 7,613,747 B1                                        Page 1 of 1
APPLICATION NO.  : 11/147932
DATED            : November 3, 2009
INVENTOR(S)      : Thakur et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 355 days.

Signed and Sealed this

Nineteenth Day of October, 2010

David J. Kappos
*Director of the United States Patent and Trademark Office*